United States Patent
Chen et al.

(10) Patent No.: US 7,654,121 B2
(45) Date of Patent: Feb. 2, 2010

(54) METHOD FOR SELECTING QOS POLICY

(75) Inventors: Weishan Chen, Shenzhen (CN); Zhiming Ding, Shenzhen (CN); Huangwei Wu, Shenzhen (CN); Bo Yang, Shenzhen (CN); Junjun Liao, Shenzhen (CN); Dongqi Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 483 days.

(21) Appl. No.: 11/633,172

(22) Filed: Dec. 4, 2006

(65) Prior Publication Data
US 2007/0189185 A1 Aug. 16, 2007

(30) Foreign Application Priority Data
Feb. 14, 2006 (CN) ............ 2006 1 0033655

(51) Int. Cl.
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |

(52) U.S. Cl. ............ 70/252; 370/235; 370/395.21; 370/230.1; 370/234; 455/423

(58) Field of Classification Search ........... 370/229, 370/230, 230.1, 234, 235, 395.42, 395.2, 370/395.21; 726/1; 713/153; 455/63.1, 455/67.11
See application file for complete search history.

(56) References Cited

U.S. PATENT DOCUMENTS

2003/0067874 A1* 4/2003 See et al. ............ 370/230.1

* cited by examiner

*Primary Examiner*—Huy D Vu
*Assistant Examiner*—Adnan Baig
(74) *Attorney, Agent, or Firm*—Finnegan, Henderson, Farabow, Garrett & Dunner, L.L.P.

(57) ABSTRACT

A method for selecting Quality of Service (QoS) policy, the method including: setting QoS policy processing information in a QPH; receiving, by a QoS Manager (QM), a QoS request from a CP, selecting a QPH to provide QoS policy for a traffic stream according to the processing information of each QPH in a home network, and providing QoS policy to the traffic stream according to the QoS policy of the selected QPH. Through the method and the system of the present invention, the problem that only the QoS policy of the QPH specified by the CP or the default QoS policy can be used as the QoS policy of the traffic stream when multiple QPHs exist in the home network is solved.

5 Claims, 4 Drawing Sheets

METHOD FOR SELECTING QOS POLICY

FIELD OF THE TECHNOLOGY

The present invention relates to technologies for controlling Quality of Service (QoS) of traffic streams transmitted in a network, and more specifically, to a method for selecting a QoS policy for a Universal Plug and Play (UPnP) device used in a home network.

BACKGROUND OF THE INVENTION

Along with the development of digital technologies, the UPnP technique is used in more and more family devices, such as UPnP Audio/Video device medium server and medium player, UPnP printer and UPnP gateway device, etc. The UPnP QoS technology in the home network effectively guarantees the normal function of the UPnP devices and provides better QoS experiences for users. For example, when a real-time traffic stream (including audio, video, voice and game, etc) is transmitted in the network, the UPnP QoS technology can provide a relatively small time delay and jitter, thereby improving the experience of the user.

FIG. 1 shows a schematic diagram of an UPnP QoS architecture, which includes a QoS Manager (QM), a QoS policy Holder (QPH) and a QoS Device (QD), wherein, the QM, used for receiving a QoS request from a Control Point (CP), sending traffic stream information to the QPH and acquiring QoS policy from the QPH, controlling the QD to perform QoS configuration and setup as well as QoS regulation and release when transmitting the traffic stream according to the QoS policy;

the QPH, used for obtaining a corresponding QoS policy according to the traffic stream information provided by the QM and sending the QoS policy to the QM;

the QD, used for QoS setup for a traffic stream and QoS regulation and release under the control of the QM when transmitting the traffic stream.

The operation principle of the UPnP QoS includes:

1) The CP obtains traffic stream information, such as the type of the traffic stream to be played, and sends a QoS request to the QM;

2) the QM sends the traffic stream information to the QPH and requests for a QoS policy;

3) the QPH provides the corresponding QoS policy to the QM according to the traffic stream information;

4) the QM configures QoS on the QD according to the QoS policy provided by the QPH.

In an UPnP QoS framework specified in the UPnP device architecture, the QoS policy processing method in UPnP QoS V1.0 includes: the CP sends a QoS request to the QM. Upon receiving the QoS request, the QM searches the home network for the QPH, if there is one QPH, the QoS policy of the QPH is used. If no QPH or multiple QPHs exist in the home network, a default QoS policy is used.

In the UPnP QoS framework specified in the UPnP device architecture, the QoS policy processing method in UPnP QoS V2.0 includes: when sending a QoS request to the QM, the CP can randomly select a QPH from the home network. If one QPH is selected by the CP, the QoS policy of the selected QPH is used. If the CP does not select a QPH, the QM searches whether there is a QPH in the home network after receiving the request. If there is one QPH, the QoS policy of the QPH is used. If no QPH or multiple QPHs exist in the home network, the default QoS policy is used.

SUMMARY OF THE INVENTION

The present invention provides a method for selecting a Quality of Service (QoS) policy.

The present invention also provides a system for selecting a QoS policy.

The method in accordance with the present invention includes:

setting QoS policy processing information for each QPH, upon receiving a QoS request from a CP, selecting, by a QoS Manager (QM), a QPH to provide QoS policy for a traffic stream according to the processing information of each QPH in a home network, and providing a QoS policy for the traffic stream, wherein the QoS policy processing information comprises at least one of: last modified time of the QPH policy (QPH LMT), the start time of the QPH accessing the home network (QPH ST), total online time of the QPH being selected (QPH TOT) and QPH priority number configured by a user (QPH PN); wherein the step of setting QoS policy processing information in each QPH comprises: when a device supporting QPH service accesses the home network, or a program with QPH service starts running in the home network, setting the QPH ST by the QPH; configuring, by a user, a QoS policy and recording the QPH ST and the QPH PN according to the home network status; wherein the step of selecting a QPH to provide QoS policy for the traffic stream according to the QPH policy processing information in each QPH in the home network comprises: when the QM determines that the CP has specified a QPH to provide QoS policy for the traffic stream, searching, by the QM, the home network to check whether there exists a selected QPH; if there is no selected QPH, determining to use the QPH specified by the CP to provide QoS policy for the traffic stream; if there is a selected QPH, determining whether the QPH specified by the CP is the selected QPH according to the QoS policy processing information of the selected QPH; and when the QM determines that there is no QPH being specified by the CP to provide QoS policy for the traffic stream, searching, by the QM, the home network to check whether there exists a selected QPH; if there is no selected QPH, comparing the QPH LMT and selecting a QPH having the latest modified QoS policy to serve the traffic stream; or comparing the QPH ST and selecting the QPH accessing the home network first to serve the traffic stream; or comparing the QPH TOT and selecting the QPH having the longest online time to serve the traffic stream; or comparing the QPH PN and selecting the QPH having the highest priority to serve the traffic stream; or selecting the QPH to serve the traffic stream according to any combination of the above; and if there exists a selected QPH, determining to use the selected QPH to provide QoS policy for the traffic stream.

In view of the above, according to the method and system provided by the present invention, when multiple QPHs exist in the home network, the default QoS policy or the QoS policy of the QPH selected by the CP are not used directly, which may improve the QoS experiences of the users.

DETAILED DESCRIPTION OF THE INVENTION

The present invention will be described in detail with reference to embodiments and accompanying drawings hereinafter.

It can be seen from the related art that, a confusion of QoS policies in the home network may be caused under the UPnP QoS V2.0. In addition, when multiple QPHs exist in the home network and the CP does not select a QPH, the default QoS policy is used, which invalidates the QPH which has been configured with a policy by the user. Furthermore, at this time, the user cannot modify or configure the default QoS policy of the home network, thus the user has no ability to intervene in the QoS policy of the home network.

In order to solve the problem that, only the QoS policy of the QPH specified by the CP or the default QoS policy can be used as the QoS policy for the traffic stream when multiple QPHs exist in the home network, the embodiments of the present invention add QoS policy processing information in the QPH. When the CP sends a QoS request to the QM, the QM determines which QPH should be selected to provide QoS policy for the traffic stream according to the QoS policy processing information contained in the QPHs. And the QM sends the traffic stream information to the selected QPH and requests for a QoS policy. Then the QPH provides the corresponding QoS policy to the QM according to the received traffic stream information. Finally, according to the QoS policy provided by the QPH, the QM configures the QD to set up QoS for guaranteeing QoS of the traffic stream.

Figure 1:
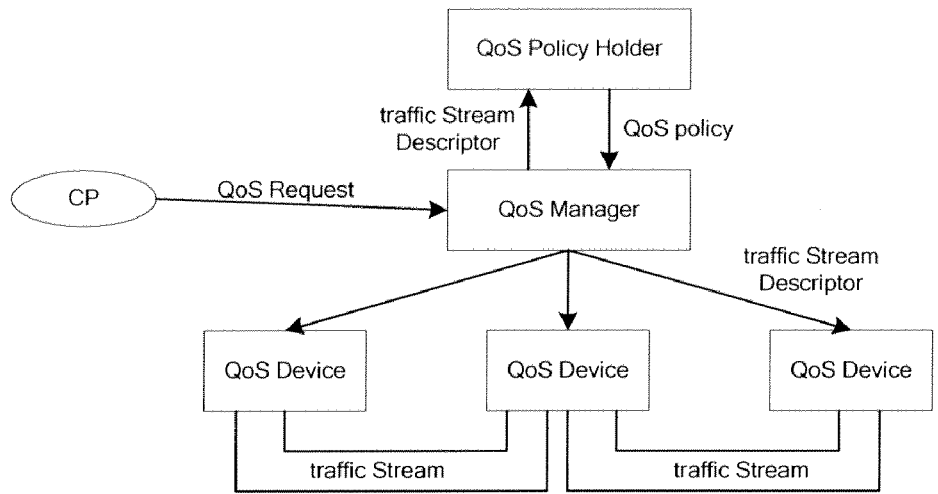
FIG. 1 is a schematic diagram illustrating an UPnP QoS architecture.
Figure 2:
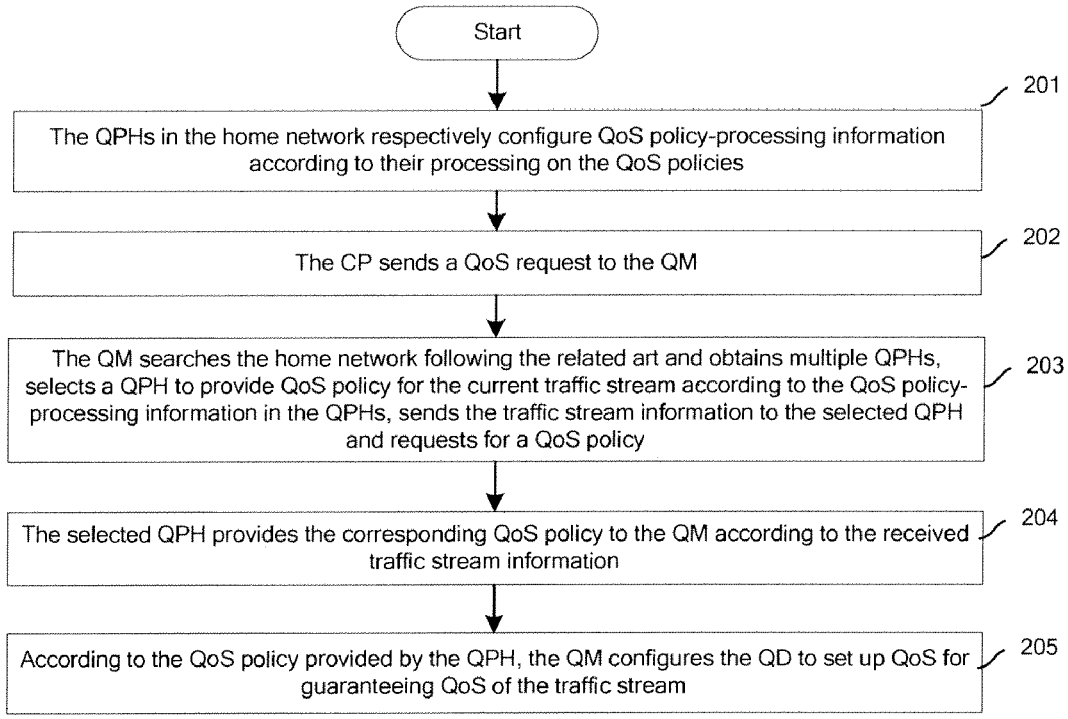
FIG. 2 is a flowchart illustrating a method for selecting a QoS policy.

FIG. 2 shows a flowchart illustrating a method for selecting a QoS policy. The method includes the following steps:

Step 201: The QPHs in the home network respectively configure QoS policy processing information according to their processing on the QoS policies.

Step 202: The CP sends a QoS request to the QM.

Step 203: The QM searches the home network using the existing technology and obtains multiple QPHs, selects a QPH to provide QoS policy for the current traffic stream according to the QoS policy processing information in the QPHs, sends the traffic stream information to the selected QPH and requests for a QoS policy.

Step 204: The selected QPH provides the corresponding QoS policy to the QM according to the received traffic stream information.

Step 205: According to the QoS policy provided by the QPH, the QM configures the QD to set up QoS for guaranteeing QoS of the traffic stream.

Wherein, the QoS policy processing information configured by the QPH includes the last modified time of the QPH policy (QPH LMT), the start time of the QPH accessing the home network (QPH ST), total online time of the QPH being selected (QPH TOT) and QPH priority number configured by a user (QPH PN), etc.

Three embodiments are employed hereafter for describing the present invention.

In the first embodiment, when the CP sends a QoS request to the QM, the QM determines whether there is a QPH in the home network. If there is no QPH, the default QoS policy is used. If there is one QPH, the QoS policy of the QPH is used; and if there are more than one QPH, the following solution is used for selecting a QPH.

Firstly, the function of a QPH should be extended within the UPnP QoS architecture specified in the UPnP device framework, Specifically, in an A_ARG_TYPE_TrafficPolicy (an UPnP parameter defined in Extension Markup Language (XML) for describing QoS information of a traffic stream, and for returning the QoS policy obtained from the QPH), on the basis of several existing elements, i.e., AdmissionPolicy (a Boolean value, indicates whether the traffic stream is permitted to enter the network), TrafficImportanceNumber (indicates a traffic stream level, an integer in range of 0-7) and UserImportanceNmuber (a user level, an integer in range of 0-255), at least one of following four elements, i.e., QPHPolicyLastModified, QPHStartTime, QPHOnlineTime and QPHPriorityNumber, are added to record the QoS policy processing information of a particular QPH. Wherein, the four elements respectively indicate that:

QPHPolicyLastModified: the last modified time of the QPH,

QPHStartTime: the start time of the QPH accessing the network,

QPHOnlineTime: the total online time of the QPH for accessing the network, and

QPHPriorityNumber: the priority order of the QPH configured by the user.

When setting the priority order, the user prioritizes all the QPHs in the home network. The QoS policy of a particular QPH in the home network may be regarded as the most preferable QoS policy for the home network and the priority number of the QPH holding the most preferable QoS policy is set to 1, that is, the QoS policy is used preferably. The QoS policy of another QPH in the home network may be regarded as only inferior to the most preferable QoS policy, and the priority number of the QPH is set to 2. the priority numbers of other QPHs may be set by analogy. When a new QPH is added to the network, the new QPH is set with the lowest priority automatically. Certainly, the user may reset the priority number of the new QPH by prioritizing the new QPH and the original QPHs to determine the priority number of the new QPH.

When the CP needs to set up QoS for a traffic stream, the CP sends a QoS request to the QM. If there are more than one QPH in the home network, instead of selecting by the CP a QPH from the home network or using the default QoS policy, the QM selects a QPH based on the four elements of the QPHs in the home network, i.e., QPHPolicyLastModified, QPHStartTime, QPHOnlineTime and QPHPriorityNumber. Suppose that three QPHs, A, B and C, exist in the home network, taking the comparison of the QPHPolicyLastModified of the three QPHs A, B and C as an example, the QPHPolicyLastModified of the QPH A is found to be the latest from the current time, then the QPH A is selected to provide QoS policy for the traffic stream and the QoS policy of the QPH A is used as the QoS policy for the traffic stream. Similarly, take the QPHPriorityNumber as an example. Suppose that the priority numbers of the QPH A, B and C are set to 2, 1 and 3, respectively. By comparing the values of the QPHPolicyNumber of the three QPHs A, B and C, it can be deduced that the QPH B has the highest priority, then the QPH B is selected to provide QoS policy for the traffic stream and the QoS policy of the QPH B is used as the QoS policy of the traffic stream. Besides using one of the above four elements, any combination of the four elements may be used for selecting the QPH. As described above, if the values of the QPHPolicyLastModified of the three QPHs A, B and C are the same, it is impossible to select a QPH only by the QPHPolicyLastModified, thus other element should be compared. If the values of the QPHPolicyNumber of the three QPHs A, B and C are 3, 5 and 1, respectively, i.e., the priority level of the QPH A is 3, the priority level of the QPH B is 5, and the priority level of the QPH C is 1 (the most preferable), the QPH C is then selected for providing services for the traffic stream. Similarly, the above four elements may be used in other combinations. In the case that it is impossible to select a most preferable QPH by the above described solution, i.e., multiple applicable QPHs exist, a QPH should be selected randomly.

Figure 3:
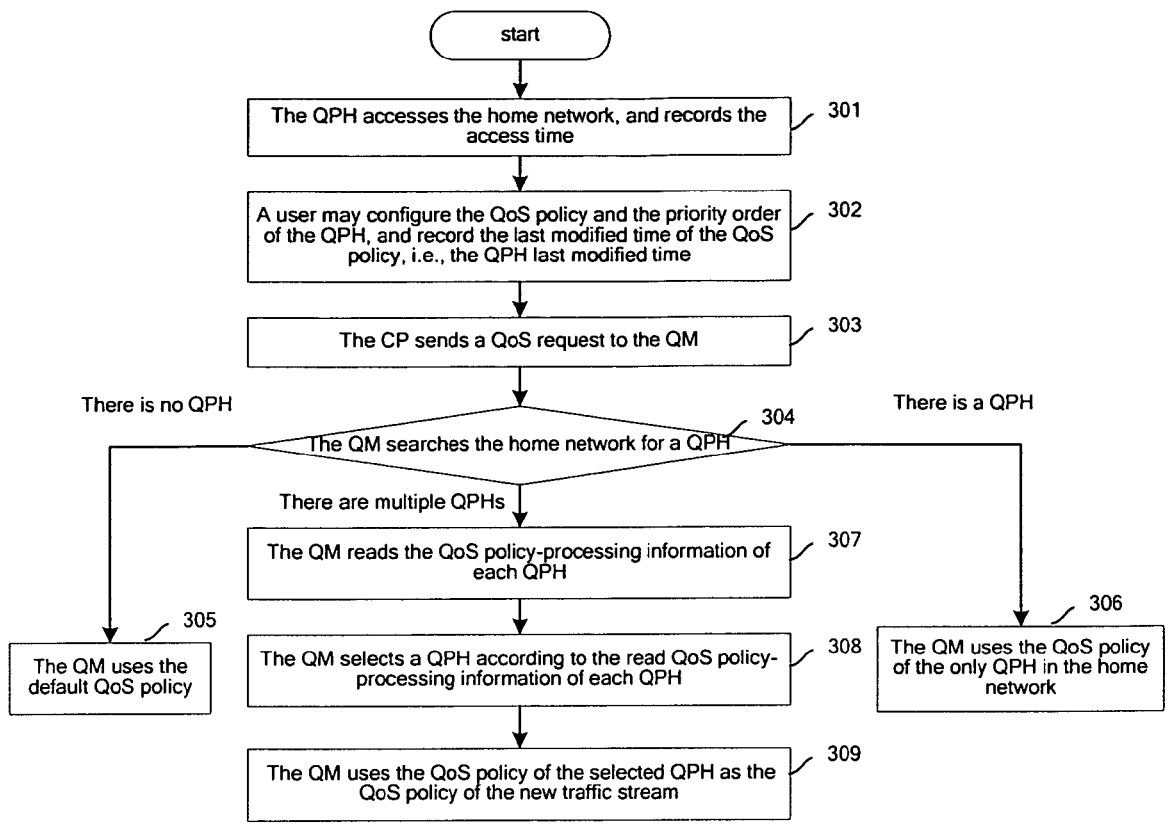
FIG. 3 is a flowchart illustrating a method for selecting a QoS policy according to a first embodiment of the present invention.

The detailed implementation is described hereinafter. Assume that all the four added elements for selecting a QPH are employed; the step of selecting a QoS policy in accordance with this embodiment is shown in FIG. 3, which includes the following steps:

Step 301: The QPH accesses the home network, and records the access time.

When an UPnP device with QPH service accesses the home network, or when a program with QPH service starts running on a device of the home network, the QPH starts to work and records the time when accessing the home network, i.e., the QPHStartTime.

Step 302: A user may configure the QoS policy and the priority order of the QPH, and record the last modified time of the QoS policy, i.e., the QPHPolicyLastModified.

The user may configure the QoS policy of the QPH according to the home network status of his/her own, and after the configuration of the QoS policy, record the last modified time of the QoS policy. Meanwhile, the user may also set the priority orders of the QPHs in the home network according to the method mentioned above.

Step 302 is optional. After the QPH accesses the home network, the user may also not configure the QoS policy of the QPH but permit the configured QoS policy, priority orders and the last modified time.

Step 303: The CP sends a QoS request to the QM.

When the network wants to set up QoS for a new traffic stream, the CP sends a QoS request to the QM through calling a RequestTrafficQoS( ) action.

Step 304: The QM searches the home network for a QPH.

If there is no QPH in the home network, go to step 305. If there is only one QPH in the home network, go to step 306. If there are more than one QPH in the home network, go to step 307.

Step 305: The QM uses the default QoS policy.

Since there is no QPH in the home network, the QM uses the default QoS policy.

Step 306: The QM uses the QoS policy of the only QPH in the home network.

Since there is only one QPH in the home network, the QM uses the QoS policy of the only QPH in the home network, meanwhile, counts the total online time of the QPH.

Step 307: The QM reads the QoS policy processing information of each QPH.

When more than one QPH exist in the home network, the QM reads the QoS policy processing information, including QPHPolicyLastModified, QPHStartTime, QPHOnlineTime and QPHPriorityNumber, etc., of each QPH in the home network through a QPH: GetTrafficPolicy( ) action.

Step 308: The QM selects a QPH according to the read QoS policy processing information of each QPH.

Based on the QPHPolicyLastModified information of the QPHs, the QPH with the latest modified QoS policy is selected to serve the new traffic stream. Or, based on the QPHStartTime of the QPHs, the QPH accessing the home network first is selected to serve the new traffic stream. Or, based on the QPHOnlineTime of the QPHs, the QPH with the longest online time is selected to serve the new traffic stream. Or, based on the QPHPriorityNumber of the QPHs, the QPH with the highest priority is selected to serve the new traffic stream. Or, based on any combination of the above four elements, a particular QPH is selected to serve the new traffic stream.

Step 309: The QM uses the QoS policy of the selected QPH as the QoS policy of the new traffic stream.

After selecting the QPH, the QM uses the policy of the selected QPH to configure the QD, setup QoS for guaranteeing the quality of service of the traffic stream, and start to count the total online time of the QPH.

In the second embodiment, after determining the QPH by the method shown in FIG. 3, rather than directly using the QoS policy of the selected QPH, the QM synchronizes the QoS policy of the selected QPH and the QoS policies of all the other QPHs such that the QoS policies of all the QPHs in the home network are the same as the QoS policy of the selected QPH, thus any one of the QPHs may be selected for provision of the QoS policy.

This embodiment is described in detail hereinafter. In this embodiment, the processes of expanding the QPH service function and the setup of the information elements are identical with that described in the first embodiment. After selecting the QPH for the new traffic stream according to the QoS policy processing information of each QPH as in the first embodiment, when synchronizing the QoS policies of all the QPHs in the home network according to the QoS policy of the selected QPH, expansion of the QPH service function is needed first in this embodiment. A reading action and a setting action: GetPolicyFromQoSPolicyHolder( ) and SetPolicyToQoSPolicyHolder( ) are added on the basis of the original actions of the QPH to synchronize the QoS policies of all the QPHs in the home network. The detailed process is described below:

(1) The QPH:: GetPolicyFromQoSPolicyHolder( ) action is to read the QoS policy of the QPH, i.e., read the QoS policy from the selected QPH. The QoS policy includes different traffic stream priority levels of different traffic streams and different user levels of different users. The QoS policy of the QPH is set by the user or initialized by device vendors.

(2) The QPH:: SetPolicyToQoSPolicyHolder( ) action is to set the QoS policies of the QPHs, i.e., set the read QoS policy to the QoS policy of all the QPHs in the home network. The process of setting the QoS policy does not change the values of the QPHPolicyLastModified, QPHStartTime, QPHOnlineTime and QPHPriorityNumber of the QPH.

Figure 4:
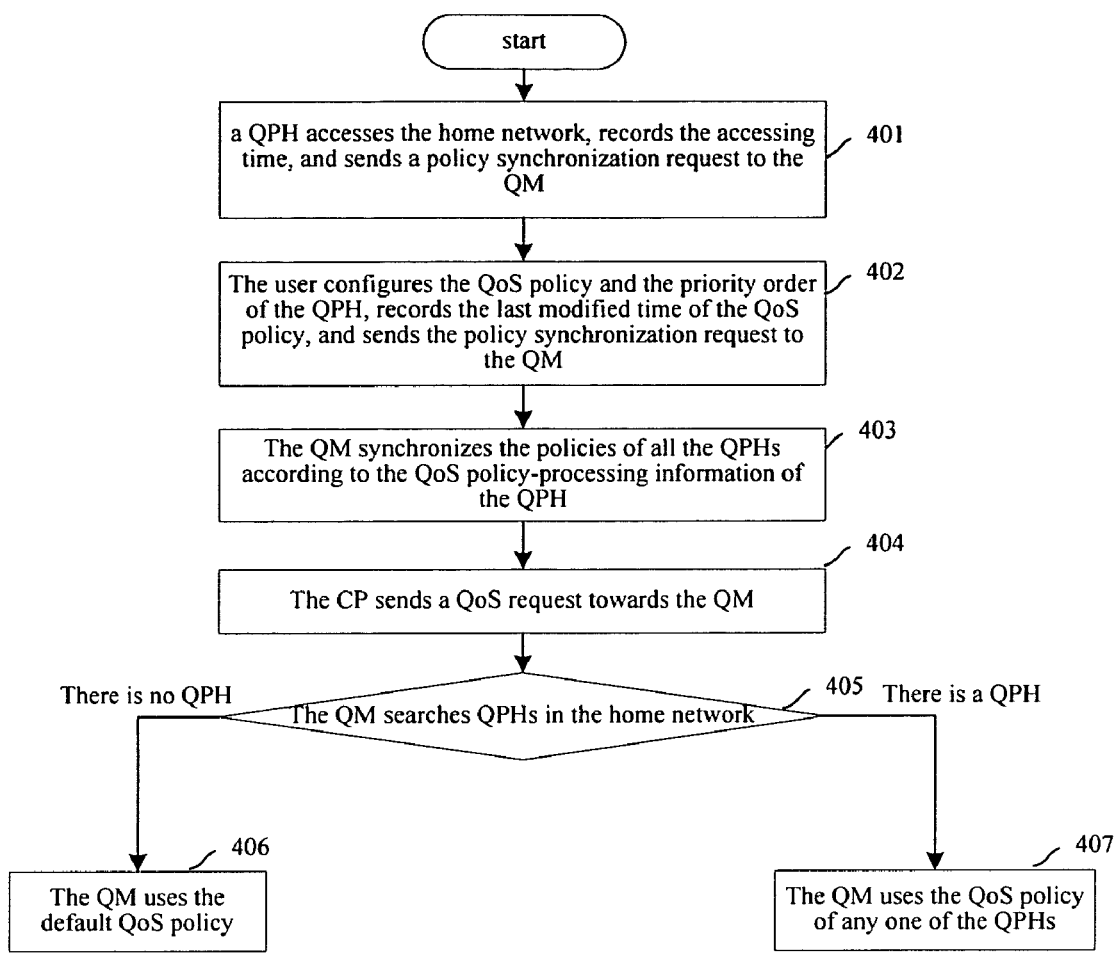
FIG. 4 is a flowchart illustrating a method for selecting a QoS policy according to a second embodiment of the present invention.
Figure 5:
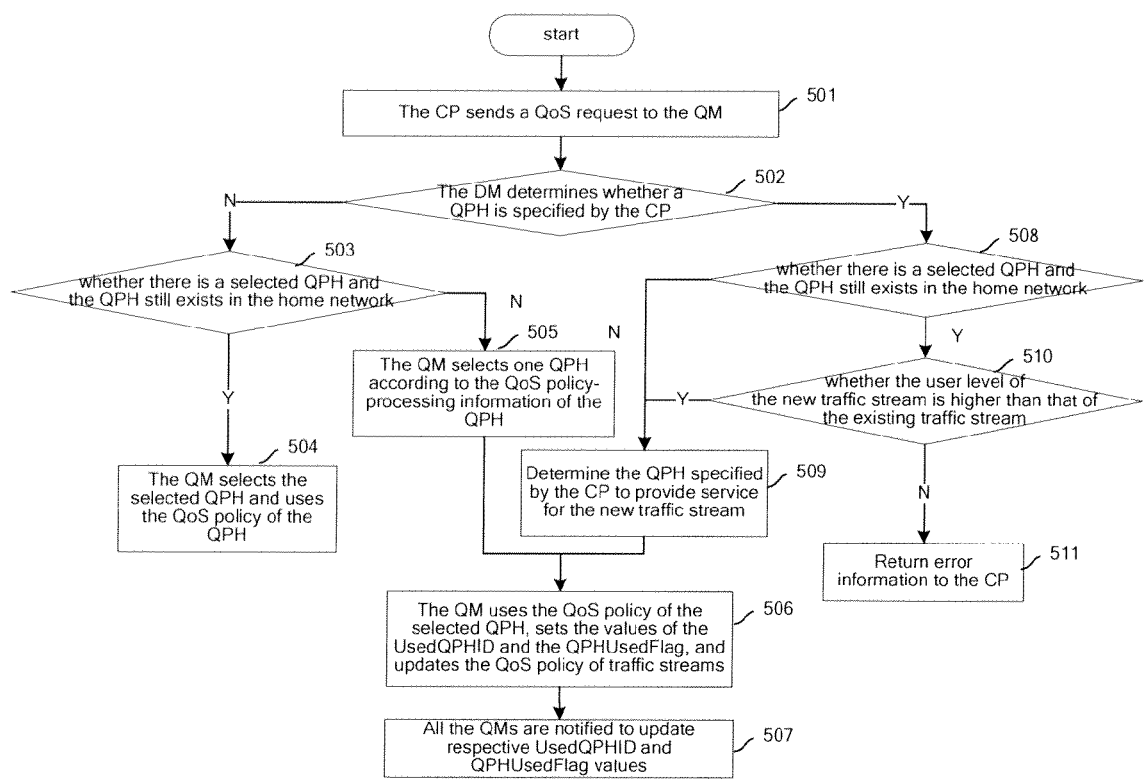
FIG. 5 is a flowchart illustrating a method for selecting a QoS policy according to a third embodiment of the present invention.

FIG. 4 shows a process of synchronizing the QoS policies of all the QPHs in the home network according to the QoS policy of a particular QPH, which includes these steps:

Step 401: a QPH accesses the home network, records the accessing time, and sends a policy synchronization request to the QM.

When an UPnP device with QPH service accesses the home network, or when a program with QPH service is running on a device of the home network, the QPH starts to work and records the accessing time. The QPH then sends a policy synchronization request to the QM, requesting to synchronize the QoS policies. Then go to step 403.

Step 402: The user configures the QoS policy and the priority order of the QPH, records the last modified time of the QoS policy, and sends the policy synchronization request to the QM.

The user may configure the QoS policy of the QPH according to the home network status of his/her own, and after modifying the QoS policy, record the last modified time of the QoS policy. Meanwhile, the user may also set the priority orders of the QPHs, and then sends the policy synchronization request to the QM, requesting to synchronize the QoS policies.

Step 402 is optional. After the QPH accesses the home network, the user may also not configure the QoS policy of the QPH but permit the configured QoS policy, priority order and the last modified time.

Step 403: The QM receives the policy synchronization request (may be sent after the QPH accesses the home network, or after the user modifies the QoS policy and the priority order of the QPH and records the last modified time of the QoS policy) and synchronizes the policies of all the QPHs according to the QoS policy processing information of the QPH.

When receiving the policy synchronization request sent by the QPH and there are more than one QPH exist in the home network, the QM synchronizes the policies of the QPHs.

The QM reads the QoS policy processing information, including QPHPolicyLastModified, QPHStartTime, QPHOnlineTime and QPHPriorityNumber, etc., of each QPH in turn in the home network by calling a QPH: GetTrafficPolicy( ) action, and selects a QPH.

The QM calls a QPH:: GetPolicyFromQoSPolicyHolder( ) action to read the QoS policy from the selected QPH. For other QPHs except for the selected QPH, the QM calls a QPH:: SetPolicyToQoSPolicyHolder( ) action to set the QoS policies of all the QPHs to the QoS policy of the selected QPH without the values of the QPHPolicyLastModified, QPHStartTime, QPHOnlineTime and QPHPriorityNumber of each QPH changed, meanwhile, counts the total online time of the selected QPH.

It should be noted that, different methods and ways may be used for the implementation of the QPH QoS policy synchronization. In addition, when the QPH:: GetPolicyFromQoSPolicyHolder( ) action is performed for QPH QoS policy setup, a backup of the QoS policy of the QPH may be pre-performed.

Step 404: The CP sends a QoS request towards the QM.

When the network wants to set up QoS for a new traffic stream, the CP sends a QoS request to the QM through a QM: RequestTrafficQoS( ) action.

Step 405: The QM searches the home network for a QPH.

After receiving the above request, the QM searches the home network for a QPH. If there is no QPH, go to step 406. If there is one or more QPHs, go to step 407.

Step 406: The QM uses the default QoS policy.

Step 407: The QM finds that such parameter as QPHPolicyLastModified of each QPH is identical and selects the QoS policy of any one of the QPHs.

When the CP selects a QPH, the QoS policy of the selected QPH is used. Or when only one QPH exists in the home network, the QoS policy of the QPH is used, and the total use time of the QPH is counted. Or when more than one QPH exist in the home network, the QoS policy of any one of the QPHs is used, and the total use time of the QPH is counted.

In the third embodiment, a QPH is selected according to the QPH which has been selected and the user levels.

When the CP sends a QoS request to the QM, the QM first determines whether there is a QPH exists in the home network. If there is no QPH, the default QoS policy is used. If only one QPH exists in the home network, the QoS policy of the QPH is used. If more than one QPH exist in the home network, the QPH may be selected in accordance with the following solution.

1. If the CP does not specify a QPH, the QM searches the home network to check whether a selected QPH exists. If there is no selected QPH, select a QPH to provide QoS policy for the new traffic stream according to the QoS policy processing information of each QPH. If there is a selected QPH, the QoS policy of the selected QPH is used as the QoS policy of the new traffic stream.

2. If the CP specifies a QPH from multiple QPHs in the network, the QM searches the home network to check whether a selected QPH exists. If no selected QPH is found, the QPH specified by the CP is used as the QPH for providing QoS policy to the new traffic stream. If there is a selected QPH, compare the user level of the new traffic stream with that of the existing traffic stream in the home network. If the user level of the new traffic stream is higher than that of the existing traffic stream, the QPH specified by the CP is used as the QPH for providing QoS policy to the new traffic stream; otherwise, return error information to the CP.

The QM employs a QPHUsedFlag (serves to mark whether there exists a selected QPH in the home network) to record the selected QPH in the home network. If a selected QPH exists in the home network, the QPHUsedFlag is set to 1; otherwise, the QPHUsedFlag is set to 0. The QM also employs a UsedQPHID to store the PolicyHolderId of the selected QPH in the home network.

A process of selecting the QoS policy according to the fourth embodiment of the present invention is shown in FIG. 4, which includes steps as follows.

Step 501: The CP sends a QoS request to the QM.

When the network wants to set up QoS for a new traffic stream, the CP sends a QoS request to the QM through a QM: RequestTrafficQoS( ) action.

Step 502: Decide whether a QPH is specified by the CP.

If the CP selects or specifies a QPH in the network, go to step 508. If the CP does not select or specify a QPH in the network, go to step 503.

Step 503: Decide whether there is a selected QPH and the selected QPH still exists in the home network.

The QM searches the home network and determines whether there is a selected QPH in the home network according to the value of the QPHUsedFlag. If the value of the QPHUsedFlag is 1 and there is a QPH whose PolicyHolderId is equal to the UsedQPHID, go to step 504. Otherwise, it indicates that there is no selected QPH in the home network, or the selected QPH is not in the home network any more, then go to step 505.

Step 504: The QM selects the selected QPH and uses the QoS policy of the selected QPH.

The QM selects the selected QPH whose PolicyHolderId is equal to the UsedQPHID to be the QPH providing QoS policy for the new traffic stream, and uses the QoS policy of this QPH.

Step 505: The QM selects one QPH according to the QoS policy processing information of the QPH.

Search all the QPHs in the home network, if there is no QPH in the home network, the default QoS policy is used. If there is one QPH, the QPH is selected to provide QoS policy. If there are multiple QPHs, the method of the first embodiment is used to select a QPH, i.e., a QPH is selected according to the QoS policy processing information of the QPHs in the home network.

Step 506: The QM uses the QoS policy of the selected QPH, sets the values of the UsedQPHID and the QPHUsedFlag, and updates the QoS policy of the existing traffic streams.

The QM uses the QoS policy of the selected QPH to set up QoS for the new traffic stream, stores the PolicyHolderId of the selected QPH to the UsedQPHID, and sets the value of the QPHUsedFlag to 1 (if no QPH is found by the QM in step 505, the default QoS policy is used and thus the value of the QPHUsedFlag should be set to 0). Meanwhile, the QM searches all the traffic streams in the home network. If there are existed traffic streams, update the QoS policies of all the existed traffic streams in the home network using the QoS policy of the selected QPH.

Step 507: notify all the QMs to update their UsedQPHID and QPHUsedFlag respectively.

The QM returns the UsedQPHID and the QPHUsedFlag to the CP and the CP notifies other QMs in the home network, or the QM directly notifies other QMs in the home network to update UsedQPHID and the QPHUsedFlag respectively. Thus the UsedQPHID and the QPHUsedFlag used by each QM may be maintained the same.

Step 508: Decide whether there is a selected QPH and the QPH still exists in the home network.

If the CP selects or specifies a QPH in the network, the QM searches all the QPHs in the home network, and determines whether a selected QPH exists in the home network according to the value of the QPHUsedFlag. If the value of the QPHUsedFlag is 1 and there is a QPH whose PolicyHolderId is equal to the UsedQPHID in the home network, go to step 510. Otherwise, it indicates that there is no selected QPH in the home network, or the selected QPH is not in the home network any longer, then go to step 509.

Step 509: select the QPH specified by the CP to provide service for the new traffic stream, then go to step 506.

Step 510: determine whether the user level of the new traffic stream is higher than that of the existing traffic stream.

Through a QPH: GetTrafficPolicy( ) action, the QM obtains the QoS policy from the selected QPH (whose PolicyHolderId is equal to the UsedQPHID) in the home network as the QoS policy of the new traffic stream which requires to set up QoS, and accordingly obtain the user level of the new traffic stream (QPHPriorityNumber). The QM searches all the traffic streams, if a traffic stream already exists in the home network, compare the user level of the new traffic stream with that of the existed traffic stream in the home network. If the user level of the existed traffic stream is not lower than that of the new traffic stream, go to step 511. If the user level of the new traffic stream which requires to set up QoS is higher than that of all the existing traffic streams, go to step 509.

Step 511: Return error information to the CP.

Since there is an existed traffic stream in the home network and the user level of the existed traffic stream is not lower than that of the new traffic stream, the QoS policy of the home network cannot be modified, thus the QoS policy of the QPH selected or specified by the CP cannot be used. The QM returns error information to the CP. Upon receiving the error information which indicates a failure QoS configuration intimated by the CP, the CP can perform a corresponding operation, e.g., cancel the transmission of the traffic stream.

In order to implement the method provided by the embodiments of the present invention, a system for selecting the QoS policy is also put forward. As shown in FIG. 6, the system includes a QM, QPHs with QoS policy processing information, and a QD.

The QM serves for receiving a QoS request from the CP, selecting one QPH according to the QoS policy processing information respectively obtained from multiple QPHs in the home network, sending a traffic stream to the selected QPH and requesting for a QoS policy from the QPH, controlling the QD to perform QoS configuration and setup as well as QoS regulation and release according to the QoS policy.

The QPH serves to provide QoS policy processing information to the QM, obtain the QoS policy according to the traffic stream provided by the QM, and send the QoS policy to the QM.

The QD sets up QoS for the traffic stream and performs QoS regulation and release when the traffic stream is transmitted under the control by the QM.

The process of the QM selecting a QPH according to the QoS policy processing information of multiple QPHs in the home network is determined according to the above embodiments.

The foregoing is only the preferred embodiments of the present invention and is not intended to limit the protection scope of the present invention. All modifications, variations and equivalent replacements within the spirit and scope of the disclosure as defined by the appended claims are covered in the protection scope of the present invention.

What is claimed is:

1. A method for selecting Quality of Service (QoS) policy, comprising:

setting QoS policy processing information for each QoS Policy Holder (QPH);

upon receiving a QoS request from a Control Point (CP), selecting, by a QoS Manager (QM), a QPH to provide QoS policy for a traffic stream according to the QoS policy processing information of each QPH in a home network, and providing a QoS policy for the traffic stream;

wherein the QoS policy processing information comprises at least one of: last modified time of the QPH policy (QPH LMT), the start time of the QPH accessing the home network (QPH ST), total online time of the QPH being selected (QPH TOT) and QPH priority number configured by a user (QPH PN);

wherein the step of setting QoS policy processing information in each QPH comprises: when a device supporting QPH service accesses the home network, or a program with QPH service starts running in the home network, setting the QPH ST by the QPH; configuring, by a user, a QoS policy and recording the QPH ST and the QPH PN according to the home network status;

wherein the step of selecting a QPH to provide QoS policy for the traffic stream according to the QPH policy processing information in each QPH in the home network comprises:

when the QM determines that the CP has specified a QPH to provide QoS policy for the traffic stream, searching, by the QM, the home network to check whether there exists a selected QPH;

if there is no selected QPH, determining to use the QPH specified by the CP to provide QoS policy for the traffic stream;

if there is a selected QPH, determining whether the QPH specified by the CP is the selected QPH according to the QoS policy processing information of the selected QPH; and when the QM determines that there is no QPH being specified by the CP to provide QoS policy for the traffic stream, searching, by the QM, the home network to check whether there exists a selected QPH;

if there is no selected QPH, comparing the QPH LMT and selecting a QPH having the latest modified QoS policy to serve the traffic stream; or comparing the QPH ST and selecting the QPH accessing the home network first to serve the traffic stream; or comparing the QPH TOT and selecting the QPH having the longest online time to serve the traffic stream; or comparing the QPH PN and selecting the QPH having the highest priority to serve the traffic stream; or selecting the QPH to serve the traffic stream according to any combination of the above; and if there exists a selected QPH, determining to use the selected QPH to provide QoS policy for the traffic stream.

2. The method of claim 1, wherein the step of determining whether the QPH specified by the CP is the selected QPH according to the QoS policy processing information of the selected QPH comprises:

obtaining, by the QM, the QoS policy from the selected QPH and determining the user level of the traffic stream, and comparing the user level of the traffic stream with that of the existing traffic stream in the home network; if the user level of the existing traffic stream is no lower than that of the traffic stream, sending error information to the CP; otherwise, determining the QPH specified by the CP to be the QPH for providing QoS policy to the traffic stream.

3. The method of claim 1, further comprising:

after the step of determining the QPH specified by the CP to be the QPH for providing QoS policy to the traffic stream, using, by the QM, the QoS policy of the QPH specified by the CP, setting, in the QM, an identifier indicating that there is a used QPH and a QPH identifier for the QPH specified by the CP, and updating the QoS policy of the existing traffic stream; and notifying, by the QM, other QMs to update the identifier indicating that there is a used QPH for the selected QPH and the QPH identifier for the QPH specified by the CP.

4. The method of claim 2, further comprising:

after the step of determining the QPH specified by the CP to be the QPH for providing QoS policy to the traffic stream, using, by the QM, the QoS policy of the QPH specified by the CP, setting, in the QM, a used QPH identifier indicating that there is a used QPH and a QPH identifier for the QPH specified by the CP, and updating the QoS policy of the existing traffic stream; and notifying, by the QM, other QMs to update the identifier indicating that there is a used QPH for the selected QPH and the QPH identifier for the QPH specified by the CP.

5. The method of claim 1, further comprising:

when the QM determines that there is no QPH being specified by the CP to provide QoS policy for the traffic stream and after the step of selecting a QPH to provide QoS policy for the traffic stream, using, by the QM, the QoS policy of the selected QPH, setting, in the QM, an identifier indicating that there is a used QPH and a QPH identifier for the selected QPH, updating the QoS policy of the existing traffic stream; and notifying, by the QM, other QMs to update their respective identifier indicating that there is a used QPH and update their respective QPH identifier for the selected QPH.

* * * * *